(12) United States Patent
Barreto

(10) Patent No.: US 10,308,867 B2
(45) Date of Patent: Jun. 4, 2019

(54) FLUID COMPOSITION AND METHOD FOR STIMULATION IN THE FIELD OF OIL AND GAS PRODUCTION

(71) Applicant: ARKEMA FRANCE, Colombes (FR)

(72) Inventor: Gilles Barreto, Messimy (FR)

(73) Assignee: ARKEMA FRANCE, Colombes (FR)

( * ) Notice: Subject to any disclaimer, the term of this patent is extended or adjusted under 35 U.S.C. 154(b) by 279 days.

(21) Appl. No.: 14/983,879

(22) Filed: Dec. 30, 2015

(65) Prior Publication Data

US 2016/0186047 A1 Jun. 30, 2016

Related U.S. Application Data

(60) Provisional application No. 62/098,620, filed on Dec. 31, 2014.

(51) Int. Cl.

| | | |
|---|---|---|
| *E21B 43/26* | (2006.01) | |
| *C09K 8/62* | (2006.01) | |
| *C09K 8/80* | (2006.01) | |
| *C09K 8/64* | (2006.01) | |
| *C09K 8/60* | (2006.01) | |

(52) U.S. Cl.
CPC ............ *C09K 8/80* (2013.01); *C09K 8/605* (2013.01); *C09K 8/64* (2013.01); *C09K 8/805* (2013.01); *E21B 43/26* (2013.01); *C09K 2208/32* (2013.01)

(58) Field of Classification Search
CPC ......... E21B 43/26; E21B 43/267; C09K 8/80; C09K 8/62
See application file for complete search history.

(56) References Cited

U.S. PATENT DOCUMENTS

| | | |
|---|---|---|
| 3,368,627 A | 2/1968 | Hurst |
| 3,846,310 A | 11/1974 | Blackwell |
| 5,925,611 A | 7/1999 | Flynn et al. |
| 6,729,409 B1 | 5/2004 | Gupta et al. |

| | | | |
|---|---|---|---|
| 2006/0264334 A1* | 11/2006 | Gupta | C09K 8/64 507/214 |
| 2009/0095014 A1 | 4/2009 | Sun et al. | |
| 2011/0247823 A1* | 10/2011 | Dams | C09K 8/584 166/305.1 |
| 2011/0284230 A1 | 11/2011 | Loree | |
| 2014/0251623 A1 | 9/2014 | Lestz et al. | |

FOREIGN PATENT DOCUMENTS

| | | |
|---|---|---|
| CA | 2116857 A1 | 4/1993 |
| CA | 2356081 A1 | 6/2000 |
| EP | 1837325 A1 | 9/2007 |
| WO | 0036272 A1 | 6/2000 |
| WO | 2006123100 A2 | 11/2006 |
| WO | 2014147313 A1 | 9/2014 |

OTHER PUBLICATIONS

Ferguson, R.I., et al., "A simple universal equation for grain settling velocity," Nov. 2004, pp. 933-937, vol. 74(6), Journal of Sedimentary Research (SEPM) (abstract only).
International Search Report and Written Opinion of the International Searching Authority for International Application No. PCT/EP2015/081021, dated Mar. 8, 2016, 10 pages.
International Preliminary Report on Patentabiltiy for International Application No. PCT/EP2015/081021, dated Jul. 4, 2017, 8 pages.
Russian Search Report for Russian Application No. 2017126989, dated Mar. 30, 2018, 2 pages.
"Gelled Liquid Gas Works as Frac Fluid," The Oil and Gas Journal, pp. 60-61 (Jul. 5, 1971).
Canadian Examination Report for Canadian Application No. 2,971,530, dated May 28, 2018, 4 pages.
Australian Examination Report for Australian Application No. 2015373484, dated Sep. 18, 2017, 3 pages.

* cited by examiner

*Primary Examiner* — Catherine Loikith
(74) *Attorney, Agent, or Firm* — RatnerPrestia

(57) ABSTRACT

A fracturing carrier fluid for fracturing a subterranean formation contains at least one linear or branched hydrofluorocarbon ether compound having a boiling point, at a pressure of 1 atmosphere, of between 0° C. and 90° C. A fracturing fluid contains the fracturing carrier fluid and proppants. A method for fracturing a subterranean formation uses the fracturing fluid.

20 Claims, No Drawings

FLUID COMPOSITION AND METHOD FOR STIMULATION IN THE FIELD OF OIL AND GAS PRODUCTION

This application claims the benefit of priority of U.S. Provisional Application No. 62/098,620, filed Dec. 31, 2014, and French Application No. FR 14 63516, filed Dec. 31, 2014, the entireties of which applications are incorporated herein by reference.

The present invention relates to the treatment of fluid-bearing formations with fracturing fluids.

Subterranean fluids of economic value are usually obtained from a subterranean formation via a well penetrating the formation. Fluids coming from subterranean fluid-bearing formations may be water which is for example used as a geothermal source of heating, drinking water or a source of salts. Fluids coming from subterranean fluid-bearing formations may also be oil or gas or gas condensed in its liquid state during its flowback towards the surface also called condensate.

Unfortunately subterranean fluid-bearing formations, and especially many oil and gas bearing subterranean formations, are more and more difficult to exploit on an economical point of view and require the use of specific methods and equipments to enhance the extraction of the subterranean fluids through extraction wells. Typical enhancement of the production of wells may be obtained by treatment of the formation to increase the output of subterranean fluids, such as oil and gas.

Generally such enhancement of the production of wells is achieved with the use of water that is injected in (an)other well(s) penetrating the subterranean formation, called injection well(s) or injector(s), in order to maintain the pressure of the subterranean formation at a sufficient level so that an economic flow from the subterranean formation to the surface through the producing well(s) is obtained. However productivity enhancement may not be stable over time because of plugging that may occur within the porosity of the subterranean formation near the producing well or near the injection well.

Beside oil and gas wells that are not capable of continuing to produce economically and require stimulation of production by treatment of the formation to increase the output of oil and/or gas, there also exist subterranean formations which can not produce hydrocarbons after a borehole is drilled and a well is installed to penetrate the subterranean formation. One of the reasons is because they naturally have a very low permeability like the ones associated with shale oil, shale gas, tight oil, tight gas and coal bed methane that hinders the flow of fluids.

And even for subterranean formations that produce fluids in already economically conditions, it may be desired to still increase their production levels.

A common and known method of stimulation treatment is fracturing. Conventionally carrying out such a treatment comprises injecting a liquid suspension, the fracturing fluid, down into the wellbore and back into the formation to the extent necessary so as to improve fluid permeability, usually because the number and/or size of passageways or fractures in the formation is increased. The fracturing fluid generally comprises the fracturing carrier fluid and solid particles.

To create the fractures, the fracturing fluid is injected at high pressure, and in this case a high pressure pumping equipment is necessary. Usually solid particles are also injected with the fracturing fluid in order to maintain the fractures opened. Such solid particles, also known as propping agents or "proppants", are dispersed into the fracturing carrier fluid and then transported down to the fractures during the high pressure pumping operation.

Injection is continued until a fracture with sufficient dimensions is obtained to allow the right and correct placement of propping agents. Once the proppants are in place, the injected fluids are let to leak off into the formation until the fracture gets sufficiently thinner to hold the proppants in place. The wellhead pressure is then lowered and the fluid is pumped back.

Proppants are usually granular materials, typically sand. Other commonly used proppants include resin-coated sand, intermediate-strength proppant ceramics, and high-strength proppants such as sintered bauxite and zirconium oxide. Numerous but less common proppants include plastic pellets, steel shot, glass beads, high strength glass beads, aluminum pellets, and rounded-nut shells.

In order for the treatment to be successful the fracturing fluid, usually oil or water in the liquid phase, must be removed from the well typically to avoid the clogging of the hydrocarbons of the subterranean hydrocarbons bearing formation. In many instances this is a difficult problem which involves considerable expenditure of time and money. Present-day treatments of wells generally require the use of large volumes of fracturing fluid.

For example, during fracturing treatment, wells, especially horizontal wells, commonly require as much as 20,000 tons of aqueous fracturing fluid. Before production from the reservoir can be resumed, a substantial portion if not all of the aqueous fracturing fluid must be removed there from. This represents an appreciable expenditure of time and pumping costs.

Nowadays, the most successful fracturing methods use water as the carrier fluid, more precisely either viscosified water or slickwater. Due to the higher cost of oil compared to that of water as the fracturing carrier fluid, oil fracturing is limited to subterranean formations that are sensible to water. Indeed, some formations contain specific clays that will swell when in contact with water impairing the permeability even in the presence of the fractures. However oil generally contains organic pollutants like benzene which is carcinogenic, toluene which causes serious damage to health by prolonged exposure through inhalation, ethylbenzene and xylene, which will contact and dilute into water in the subterranean formation with a risk of pollution once at the surface. Benzene, Toluene, Ethylbenzene and Xylene, also called BTEX are listed by the EPA in the Clean Air Act of 1990 as some of the 188 hazardous air pollutants.

Furthermore, some areas where stimulation is used have high constraints on the supply of water, e.g. Texas in the U.S.A. Other places have farming lands or living places in their neighborhood, making it necessary a high quality for the treatment of the flow back waters pumped back to the surface after the fracturing operations are run and before these waters are discharged.

Dow Chemicals proposed in 1966 (see e.g. U.S. Pat. No. 3,368,627) a fracturing method that uses a combination of C2-C6 hydrocarbons and carbon dioxide as the fracturing fluid. The mixture is designed to get a critical temperature sufficiently high or a critical pressure sufficiently low to remain liquid at the temperature and pressure existing during injection down the well, but also a critical temperature sufficiently low or a critical pressure sufficiently high for a substantial portion of such injected fluid to be converted to a gas upon a release of the pressure applied to the liquid during injection.

Indeed, the critical temperature and pressure are important parameters for a fracturing fluid able to be in the state of a gas. Below the critical temperature, a fluid can exist as a solid and/or a liquid and/or a gas depending on pressure and temperature. Above the critical temperature, a fluid can exist as a gas and/or a supercritical fluid depending on the pressure and temperature. If the reservoir temperature is higher than the critical temperature of the fracturing fluid, the liquid fracturing fluid will undergo a phase transition upon heating to supercritical fluid during the injection. The supercritical fluid has density and viscosity higher than that of a gas at the same temperature and lower than that of a liquid at the same pressure. So the friction of proppants with the carrier fluid is lower when the carrier fluid is in supercritical state than when it is in liquid state. In this way the settling of the proppants due to gravity, which have a higher density than the carrier fluid, is higher in the horizontal parts of the surface equipments, wells and fractures when the fracturing carrier fluid is in supercritical state. The settling of proppants is characterized by the settling velocity of the proppant particles. Avoiding settling, or at least minimizing settling, is important in order to maximize the transport efficacy which could be slowed down by frictions of the proppant particles with the surface of the piping equipments and the fracture walls. Hence minimizing or avoiding settling in equipments and fractures increases the probability for the proppants to reach the fractures and limits accumulation of proppants in horizontal parts of the equipments and fractures. Hence the proppant transport efficiency is lower when the settling velocity is higher, and this is for example the case when the fracturing carrier fluid is in supercritical state rather than when it is in liquid state.

This U.S. Pat. No. 3,368,627 proposes a solution to avoid the use of water and reduce the amount of energy needed to pump the fracturing fluid back to the surface. However this method employs two fluids, in the gaseous phase at ambient pressure and temperature, which must be compressed to get them liquid, which increases the number of equipments. What's more, carbon dioxide is difficult to compress owing to its critical point: the high critical pressure (7.3 MPa) and low critical temperature (31° C.) makes it necessary to compress the gas at pressure above 7.3 MPa and/or cool it down to temperatures below 31° C. to get it liquid.

Attempts were made to simplify the method and use only one carrier fluid other than water to suspend the proppants. "*Oil and Gas Journal*", Jul. 5, 1971, page 60, describes a gelled liquid gas useful for fracturing gas wells. The gelled liquid gas contains carbon dioxide, liquid petroleum gases, a gelling material and proppants. Viscosifying the carrier fluid, or gelling it, is useful to allow a more efficient transport of the proppants by increasing the friction between them and the carrier fluid. In this way the settling of the proppants due to gravity, which have a higher density than the carrier fluid, is limited in the horizontal parts of the surface equipments, wells and fractures.

U.S. Pat. No. 3,846,310 discloses the use of a mixture of a first alkoxide of a group IA metal and a second alkoxide of a group IIIA element as the gelling agent for a hydrocarbon carrier fluid like for example liquefied petroleum gas, heptane. In the presence of water, the gelling agent is said to go into the water phase, thus reducing the hydrocarbon viscosity. It is said that in the treatment of a gas or condensate producing formation, it is preferred that the liquid hydrocarbon be volatile at reservoir conditions. During injection operations, the liquid hydrocarbon is under pressure and retains its liquid state. When the applied pressure is relieved, the liquid will be transformed into a highly mobile vapor because of its volatility at the reservoir conditions thereby promoting rapid well cleanup. In places where there is no water in the subterranean formation, the gelling agent, that does not evaporate, will remain in the subterranean formation leading to deposits blocking the fractures and reducing the flow of hydrocarbons originally present in the subterranean formation. This limitation also applies for the publication in "*Oil and Gas Journal*", Jul. 5, 1971, page 60.

Another drawback of U.S. Pat. No. 3,846,310 is the use of heptane. Under 1 atmosphere (101.325 kPa), this alkane has a boiling point of 98° C., whereas that of toluene is 111° C. As the boiling points are close to each other (less than 20° C. difference) this would require an expensive equipment to separate both compounds in order to avoid pollution of heptane by toluene.

More recently US2011284230 claims a method of treating subterranean formations, the method comprising introducing a hydrocarbon fracturing fluid comprising liquefied petroleum gas into the subterranean formation, subjecting the hydrocarbon fracturing fluid to pressures above the formation pressure, and shutting-in the hydrocarbon fracturing fluid in the subterranean formation for a period of at least 4 hours. It is also said the hydrocarbon fracturing fluid produced by the above methods may comprise at least one gelling agent, and that the gelling agent may be any suitable gelling agent for gelling LPG, including ethane, propane, butane, pentane or mixtures of ethane, propane, butane and pentane.

However when a gelling agent is used, the problem is the formation of deposits once the pressure is relieved. If the pressure is not relieved enough to get evaporation of the hydrocarbons of the fracturing fluid, there is a risk when said fracturing fluid is pumped back to the surface. This will be difficult because of the high viscosity of the gelled fracturing fluid. In such cases, breakers may be used to reduce the viscosity. Conversely this adds more complexity with the control of dosage and delayed action time of the breaking agent on the gelling agent.

When no gelling agent is used, then the viscosity of LPG, including ethane, propane, butane, pentane or mixtures of ethane, propane, butane and pentane is very low and the proppant transport efficiency is low.

ECorp Stimulation Technologies (see http://www.ecorpintl.com/) promotes the use of propane as fracturing fluid without gelling agent. Carried under liquid form, propane is injected with sand or ceramics. Almost all of the injected propane (from 95% to 100%) is said to flow back in the form of gas, due to the natural phenomenon of pressure difference between the subterranean formation and the surface. The recovered propane is said to be re-used for stimulation operations, or re-injected in pipelines with the rest of the extracted gas. This technology unfortunately has poor efficiency to transport the proppants.

ECorp Stimulation Technologies also promotes the use of a fluorinated propane derivative which is 1,1,1,2,3,3,3-heptafluoropropane. This molecule is also known as a refrigerant under code name R-227ea, in accordance with the American Society of Heating, Refrigerating and Air Conditioning Engineers Standard 34 (ASHRAE, 2010a and 2010b). R-227ea is promoted as a stimulation fluid, in order to completely eliminate the risk associated with the flammability of regular propane. It is said that no water and no chemical additive is used in with the heptafluoropropane and that, as for regular propane, heptafluoropropane would be recovered under a gaseous form for an immediate or future re-use. R-227ea is said to be easily separable from components of natural gas extracted from the well, especially propane and butane.

The high volatility of R-227ea also represents a drawback when the fracturing fluid is prepared and injected at a relatively high ambient temperature, for example about 40° C. and higher, as this may occur in hot locations such as Texas. Blenders are used to mix the proppants with the carrier liquid fluid. Proppants held in blenders at the well site for use as proppant in the fracturing operation may reach temperatures such as 65° C. due to the exposure of the blenders to the sun. When proppants and the carrier liquid fluid are blended, some of the liquid carrier fluid may change phase resulting in lower liquid volume. To avoid this it is necessary to keep the fracturing carrier fluid liquid at such a temperature by increasing the pressure inside the blender or to cool it down, making it more costly.

What is more, the separation with butane makes it necessary to use 2 steps: first a condensation of butane which is less volatile (boiling point at a pressure of 1 atmosphere (101325 Pa), that is Normal Boiling Point or NBP, is 0° C. for n-butane whereas the NBP of R-227ea is −16° C.), and then a condensation of R-227ea which is in the gas phase after the first condensation.

There is therefore still a need for fracturing fluids that do not contain water while being at least as efficient as or more efficient than water-based fracturing fluids. There is also still a need for fracturing fluids that do not contain water and that are easily handled and stored at ambient temperature and pressure. There is also still a need for fracturing fluids that do not contain water, that do not contain carcinogenic products and that are easily recyclable as fracturing fluids without being polluted by benzene, toluene, ethylbenzene and xylene.

Despite continuous searches since 1966, there is still a need for alternative and/or enhanced fracturing carrier fluids that alleviate the drawbacks of the fracturing carrier fluids from the state of the art.

The inventors have now discovered that the above objectives are reached in whole or at least in part with the fracturing carrier fluids of the present invention which is detailed herein below.

As such, the aim of the present invention is to provide a fracturing carrier fluid with one or more, preferably all the following features:
- the fracturing carrier fluid is non aqueous, i.e. no water is added on purpose,
- the fracturing carrier fluid is of low toxicity compared to oil and more generally has a low environmental impact,
- the fracturing carrier fluid is easily transformed into a liquid or a gas, and vice-versa, upon temperature variations and/or pressure variations,
- the fracturing carrier fluid allows for a settling velocity equal to or lower than that of known fracturing carrier fluids, on the widest temperature range possible, e.g. between 20° C. and 200° C., preferably between 70° C. and 190° C., for a given size and nature of proppant,
- the fracturing carrier fluid allows for a settling velocity equal to or lower than that of water, on the widest temperature range possible, e.g. between 20° C. and 200° C., preferably between 30° C. and 190° C., more preferably between 30° C. and 140° C., for a given size and nature of proppant,
- the fracturing carrier fluid is easy to separate/recover from a flowback fluid (e.g. containing natural gas, condensate or oil, . . . ),
- and the fracturing carrier fluid is easily transformed back into liquid state.

In the following description of the present invention, the below definitions and methods will be used:

- the environmental impact of solvents is measured by the Greenhouse Warming Potential (GWP) relative to carbon dioxide for 100 year integration and by the Ozone Depletion Potential (ODP). GWP of R-227ea is 3220 and ODP is 0. GWP of propane is 20 and ODP is 0;
- Normal Boiling Point (or NBP) is the boiling point at a pressure of 1 atmosphere (101325 Pa);
- the proppant transport efficiency is assessed with the settling velocity of a single spherical solid particle (proppant) in the carrier fluid due to gravity at a given temperature corresponding to the subterranean hydrocarbon formation temperature; the lower the settling velocity, the longer the time for the proppant particles to settle down.

In a first aspect, the present invention relates to a fracturing carrier fluid for fracturing a subterranean formation, said fracturing carrier fluid comprising at least one linear or branched hydrofluorocarbon ether compound having a boiling point of between 0° C. and 90° C.

In the present invention, "hydrofluorocarbon ether" means a compound with carbon, hydrogen, fluorine and optionally chlorine atoms and bearing at least one ether function, preferably one ether function.

The selection of the appropriate fracturing carrier fluid is depending on the Normal Boiling Points of the recovered hydrocarbons: according to a preferred embodiment, the Normal Boiling Point of the appropriate fracturing carrier fluid has a difference of at least 10° C., preferably 20° C., more preferably 25° C., above or under the Normal Boiling Point of the recovered gaseous hydrocarbon that has the highest (respectively lowest) Normal Boiling Point among the mixture of recovered gaseous hydrocarbons. This renders easier the recovery, e.g. by distillation, of the fracturing carrier fluid.

According to still a preferred embodiment, the Normal Boiling Point of the fracturing carrier fluid is at least 10° C., preferably 20° C., more preferably 25° C., above the Normal Boiling Point of the recovered gaseous hydrocarbon that has the highest Normal Boiling Point among the mixture of recovered hydrocarbons, e.g. for butane, above 0° C.

Among these appropriate fracturing carrier fluids, preferred are those having a high Normal Boiling Point, preferably higher than 0° C., more preferably higher that 10° C., more preferably higher than 20° C. Most preferred fracturing carrier fluids are those having a Normal Boiling Point above ambient temperature, so that the fracturing carrier fluids are liquid a ambient temperature and thus easily separated from the other recovered gaseous hydrocarbons at ambient temperature and pressure. Another advantage of such fracturing carrier fluids that are liquid at ambient temperature is their easiness in storage and use.

These issues regarding easiness of separation and Normal Boiling Points values is of importance, especially considering the separation and distillation/condensation installation. Particularly used are separators and dehydrators that usually work at a temperature between 100° C. and 150° C. to separate oil, gas and condensate as defined above. Therefore, and as another still preferred embodiment, the most appropriate fracturing carrier fluids have a NBP below 100° C. to be easily separated from the recovered hydrocarbons (liquid or gaseous) and then condensed again in the gas treating units comprising separators, compressors, heat exchangers, and the like. The same applies for separations, distillations or condensations at pressure above atmospheric pressure.

As an other preferred embodiment the fracturing carrier fluids according to the present invention has a critical pressure ($P_{critical}$) lower than 7 MPa, preferably lower than 5 MPa so that the compression tools that are used for the transportation into the gas lines may also be used for the condensation of the fracturing carrier fluids.

For the sake of low toxicity once recycled, it is also desirable that the NBP of the fracturing carrier fluid is far from that of benzene, toluene, ethylbenzene and xylene which are respectively 80° C., 111° C., 136° C. and around 140° C. Hence a NBP below 60° C. is preferred where the recovered hydrocarbons comprise one or more components chosen from among benzene, toluene, ethylbenzene and xylene.

Hence, an appropriate fracturing carrier fluid, besides its NBP between 0° C. and 90° C., preferably meets at least one and preferably two of the following requirements: a) ODP strictly lower than 0.02, preferably 0.01, and more preferably equal to 0; and b) Critical Pressure equal to or less than 7 MPa, preferably equal to or less than 5 MPa.

According to a preferred aspect, the appropriate fracturing carrier fluid for use in the present invention has a NBP between 0° C. and 90° C. and a Critical Pressure equal to or less than 7 MPa, preferably equal to or less than 5 MPa.

According to another preferred aspect, the fracturing carrier fluid of the invention has a critical temperature equal to or greater than 110° C. and equal to or lower than 200° C.

According to still a preferred embodiment of the present invention, the at least one linear or branched hydrofluorocarbon ether compound is of formula (1):

$$C_nH_mF_pX_qO_t \qquad (1)$$

wherein n, m, p, q and t respectively represent the number of Carbon atoms, Hydrogen atoms, Fluorine atoms, X atoms and O atoms (i.e. number of ether function(s)), with n represents 2 or 3 or 4, m≥0, 9≥p≥3, q represents 0 or 1, t represents 1 or 2, and X represents an halogen atom different from fluorine, and O represents a oxygen atom and wherein the compound of formula (1) has a Normal Boiling Point (NBP) of between 0° C. and 90° C., preferably of between 5° C. and 85° C., more preferably of between 10° C. and 80° C.

It is also understood that the sum (m+p+q) is equal to or less than 2n+2, where n, m, p and q respectively represent the number of Carbon atoms, Hydrogen atoms, Fluorine atoms and X atoms in the compound of formula (1).

Preferably X represents chlorine, bromine or iodine, more preferably chlorine or bromine, still more preferably X represents chlorine.

According to a preferred embodiment, n represents 2 or 3 or 4, m≥2 and the Hydrogen atoms are borne by at least 2 different carbon atoms. According to another preferred embodiment, n represents 2 or 3. According to still another embodiment, n represents 2 or 3, m≥2 and the Hydrogen atoms are borne by at least 2 different carbon atoms. According to a further embodiment, t represents 1.

The carbon atoms in the compound of formula (1) may be arranged in linear or branched chain. Preferably, the compound of formula (1) has 0 or 1 carbon-carbon double bond.

According to a particularly preferred embodiment of the present invention, the compound of formula (1) above has a critical temperature equal to or greater than 110° C. and equal to or lower than 200° C., preferably equal to or greater than 130° C. and equal to or lower than 200° C.

According to a particularly preferred embodiment of the present invention, the compound of formula (1) above has the formula $C_nH_mF_pX_qO_t$ with n is 2 or 3, 2≤m≤4, 4≤p≤6, q represents 0 or 1 and t represents 1. Also preferred are compounds of formula (1) wherein m≥2 and the Hydrogen atoms are borne by at least 2 different carbon atoms.

Non limiting examples of compounds of formula (1) that are useful in the present invention, include RE-134, RE-236fa1, RE-236ea1, RE-245cb1, RE-338mcf2, RE-245fa1, RE-347mmy1, RE-254cb1, RE-245ca2, RE-235da1, RE-365mcf2, CHF$_2$—CHF—O—CHF$_2$, CHF$_2$—CH$_2$—O—CF$_3$, CH$_2$F—CHF—O—CF$_3$, CH$_3$—CF$_2$—O—CF$_3$, CF$_3$—CHF—O—CH$_2$F, CHF$_2$—CF$_2$—O—CH$_2$F, the isomers of the above listed compounds, as well as mixtures of two or more of the above compounds, in any proportions.

The thermodynamic properties of the compounds of formula (1), as defined above with their critical temperature and NBP, allow for easy handling of fracturing carrier fluid as well as easy separation of the fracturing carrier fluid from the recovered hydrocarbons. Moreover it has surprisingly been discovered that fracturing carrier fluids comprising at least one fluorinated compound of above formula (1), with the above mentioned thermodynamic characteristics concurring to easy handling and use, allow for a proppant settling velocity in the fracturing carrier fluid that is equal to or lower than in known fracturing carrier fluids, and as close as possible to or preferably lower than the settling velocity in water, within a wide range of subterranean formation temperatures, preferably between 20° C. and 200° C.

According to another preferred embodiment, the fracturing carrier fluid of the invention has a critical pressure lower than 70 bar (7 MPa), preferably lower than 50 bar (5 MPa), whereas carbon dioxide (CO$_2$) has a critical pressure of 73 bar (7.3 MPa). This is therefore another advantage of the fluid of the present invention which is liquid at a lower pressure value, in other words a lower pressure is sufficient to get the fracturing fluid liquid.

Furthermore, the use of compounds of formula (1) presents many advantages, particularly as compared to the use of water as fracturing carrier fluid. Among those advantages may be cited: poor, or absence, of solubilization of mineral salts present in the subterranean formations, and therefore cheaper and easier recycling process of the fracturing carrier fluid, lower impact on the subterranean formation integrity (e.g. minimized swelling or absence of swelling of the subterranean formation), and the like.

According to a preferred embodiment, the fracturing carrier fluid of the invention does not contain any toxic and environmentally harmful aromatic compounds, such as benzene, toluene, ethylbenzene and xylene, contrary to known fracturing oils that may still be used.

The fracturing carrier fluid may also comprise one or more additives well known by the skilled in the art. Examples of such additives include, as a non limiting list, biocides, corrosion inhibitors, surfactants (e.g. fluorosurfactants), scale inhibitors, anti-foaming agents, rheology modifiers (e.g. viscosity enhancers, drag reducers, etc.) and the like, as well as mixtures of two or more of the above cited additives in all proportions.

For example, drag reducers are used to reduce the friction and enable the increase of the flowrate at constant pumping, biocides are used to protect the drag reducer from biodegradation, corrosion inhibitors are used to protect the equipments from corroding, surfactants are used to increase the wetting of the fracturing fluid on equipment surfaces and/or help its foaming, scale inhibitors are used to avoid scale deposition from the water of the formation.

According to another aspect, the present invention relates to a fracturing fluid comprising at least one fracturing carrier fluid as defined above and proppants. Proppants that may be used in the fracturing fluid of the invention are any kind of proppants known by the skilled in the art, and are usually in the form of granular materials. Typically proppants include sand, resin-coated sand, intermediate-strength proppant ceramics, high-strength proppants such as sintered bauxite and zirconium oxide, plastic pellets, steel shot, glass beads, high strength glass beads, aluminum pellets, rounded-nut shells, and the like.

Proppants that may be used are of all types known in the art from US mesh 12 to US mesh 100, preferably from US mesh 20 to US mesh 100. The largest proppants generally are sieved with sieves of US mesh 20 and US mesh 40, i.e. they pass through a sieve with a mesh size of 850 μm and do not pass through a sieve with a mesh size of 425 μm. Such proppants are especially fitted for use in slickwater.

The proppant concentration generally is comprised between 20 grams and 600 grams per liter of fracturing carrier fluid, more preferably between 25 grams and 250 grams per liter of fracturing carrier fluid.

Still according to a further aspect, the present invention relates to a fracturing method of a subterranean formation using the fracturing fluid as defined herein above. The fracturing method of the present invention comprises at least the following steps:

a) providing a fracturing carrier fluid, as defined above, i.e. comprising at least one compound of formula (1) as defined above, with optional compressing and/or cooling, so that the fracturing carrier fluid is in the form of a liquid;

b) preparing a fracturing fluid by mixing the liquid fracturing carrier fluid of step a) with proppants in a vessel so as to obtain a liquid fracturing fluid; and c) injecting the said liquid fracturing fluid of step b) (i.e. a liquid dispersion), into a subterranean formation at a pressure sufficient to open one or several fractures therein.

Compression at step a) may be realized with any method known by the skilled artisan and for example with a pump, up to a pressure above the equilibrium gas-liquid pressure. Cooling at step a) may be realized with any method known by the skilled artisan and for example with a heat exchanger to a temperature below the equilibrium gas-liquid temperature.

Before step a) of the method according to the invention, the subterranean formation may be pre-treated by injecting the fracturing carrier fluid of the invention as a liquid without proppants, and/or by injecting liquid water and/or liquid hydrocarbons and/or a foam composed of water or hydrocarbons mixed with a gas. According to another alternative, the formation may be flushed after step c) by injecting the fracturing carrier fluid of the invention without proppants or liquid water or liquid hydrocarbons or eventually a foam composed of water or hydrocarbons mixed with a gas.

The method of the invention can be preceded and/or combined and/or followed with one or more known fracturing methods, which make use of slickwater, gelled water, hydrocarbons, gelled hydrocarbons, foam fluids, and the like.

The method of the invention may also comprise the recycling of any of the fracturing fluid or pre-treatment fluid or flushing fluid, which contains no proppant, or at least a little amount of proppant(s). This recycling of the fracturing carrier fluid of the invention, after its use as fracturing fluid or pre-treatment fluid or flushing fluid for a fracturing operation, comprises at least the steps of:

recovering, with pumping and/or with decompression (e.g. return to normal pressure), at least a portion of the fluid and a portion of the hydrocarbons originally present in the formation, the fluid being the fracturing carrier fluid, from the hydrocarbon reservoir to produce the recovered fluid; and separating from the recovered fluid the fracturing carrier fluid to get a gas or a liquid, alone or in admixture with hydrocarbons, with any technique known in the art, including for example one or several separator(s), one or several dehydrator(s), variations of temperature, pressure and time, and the like.

As described above, the fracturing carrier fluid for use in the present invention allows for reduced settling particle velocity of the proppant that is dispersed therein.

The theoretical settling velocity ($v_l$) of a single smooth spherical particle at a given equilibrium temperature and equilibrium pressure in a fluid is calculated using the following empirical equation (1) by Fergusson and Church, published in "Journal of Sedimentary Research", (Vol. 74, No 6, November 2004, p. 933-937), corresponding to the maximum velocity or terminal velocity or limit velocity:

$$v_l = \frac{Rgd^2}{18 v_{fluid} + \sqrt{0.75 \times 0.4 R g d^3}} \quad (1)$$

$$\text{with } R = \frac{\Delta \rho}{\rho_{fluid}} \quad (2)$$

and, substituting R of equation (2) in equation (1), results in the following equation allowing for the calculation of the settling velocity "$v_l$", expressed in m·s$^{-1}$:

$$v_l = \frac{gd^2 \Delta \rho}{\left(18 \eta_{fluid} + \sqrt{0.75 \times 0.4 d^3 g \rho_{fluid} \Delta \rho}\right)}$$

wherein "$v_{fluid}$" is the kinematic viscosity of the carrier fluid, expressed as the ratio "$\eta_{fluid}/\rho_{fluid}$", "$\eta_{fluid}$" is the dynamic viscosity of the carrier fluid in Pa·s, "g" is the gravity acceleration constant (9.81 m·s$^{-2}$), "d" is the particle diameter expressed in meters, "$\rho_{fluid}$" is the carrier fluid density expressed in kg·m$^{-3}$, and "$\Delta \rho$" is the difference of density between the particle and the carrier fluid in the liquid phase, expressed in kg·m$^{-3}$.

As an example for the settling velocity calculation, quartz sand particles may be chosen since quartz sand is often used as a proppant. Quartz sand particle density is set as the value of quartz density which is 2650 kg·m$^{-3}$. As an example, a smooth particle with a 425 μm diameter and a 2650 kg·m$^{-3}$ density has a settling velocity in the fracturing carrier fluid of the invention lower than that in water over a temperature range equal to or greater than 65° C.-75° C. The same smooth particle in the fluorinated hydrocarbon 1,1,1,2,3,3,3-heptafluoropropane (R227ea) has a higher settling velocity than in water within the temperature range of 10° C. to 190° C.

The critical pressure and critical temperature of a fluid are measured as follows: the principle of the measurement relies on the variation of the heat capacity during the phase or state change upon heating at 0.2° C. per minute. A closed test cell is filled with about 1 g of the sample fluid and then let to thermally equilibrate before heating is started. The transition is detected by the heat flow exchanged by the test cell containing the sample fluid using a calorimeter that leads to the knowledge of the critical temperature defined by the onset point. The critical temperature is graphically defined as the temperature corresponding to the intersection of the slopes before and after the transition in the heatflow curve (onset point).

The pressure in the cell is continuously measured during the heating of the test cell. The value of the pressure reached at the temperature corresponding to the critical temperature is directly read, and considering the experimental correction of the pressure transducer due to the temperature effect on the transducer response which is measured through calibration, the critical pressure is calculated. For the determination of the critical temperature and critical pressure, a C80 calorimeter commercialized by Setaram is used. The precision on the critical temperature is 0.5° C. and on the critical pressure 0.4 bar (40 kPa).

To measure the liquid density in the liquid phase, the procedure used is to 1) clean and dry the vessel; 2) pull vacuum; 3) weigh the vessel; 4) charge said vessel with the test fluid; 5) weigh again said vessel to get the weight of the test fluid added; 6) allow the temperature to equilibrate to the test temperature; 7) record the liquid volume; 8) calculate the density.

The calculation method of the liquid density (in kg·m$^{-3}$) is reproduced below with a definition of the variables:

Liquid density =

$$\frac{m_{liq}}{V_{liq}} = \frac{(m - m_{vap})}{V_{liq}} = \frac{(m - (V_{vap} \times d_{vap}))}{V_{liq}} = \frac{(m - ((V_{tot} - V_{liq}) \times d_{vap}))}{V_{liq}},$$

wherein
  $V_{tot}$ (total volume of vessel) is equal to $V_{liq}+V_{vap}$, where
    $V_{liq}$ is the measured liquid volume in the vessel, and
    $V_{vap}$ is the gas volume in the vessel,
  m (total mass of fluid added to vessel) is equal to $m_{liq}+m_{vap}$, where $m_{liq}$ is the mass of liquid, and $m_{vap}$ is the mass of gas, and
  $d_{vap}$ is the gas density at temperature T.

The gas density is calculated using ideal gas law. The precision on the temperature is 0.2° C. The precision on the liquid density is 0.1%.

To obtain the value of the dynamic viscosity, the measured kinematic viscosity is multiplied by the liquid density. The kinematic viscosity is measured using Cannon-Fenske Ostwald viscometers. The viscometers are calibrated at each temperature with fluids of known viscosity. An Ostwald type viscosity tube consists of a glass tube in the shape of a U held vertically in a controlled temperature bath. In one arm of the U is a vertical section of precise narrow bore called the capillary. Above this is a bulb, there is another bulb lower down in the other arm. In use, liquid is drawn into the upper bulb by suction and then allowed to flow down through the capillary into the lower bulb. Two marks (one above and one below the lower bulb) indicate a known volume. The time taken for the level of the liquid to pass between these marks is proportional to the kinematic viscosity.

Although the tubes are provided with a conversion factor, each tube used in the reported measurement program has been calibrated by a fluid of known properties at each temperature. The time it takes for the test liquid to flow through a capillary of a known diameter of a certain factor between two marked points is measured. By multiplying the time required by the factor of the viscometer, the kinematic viscosity is obtained. The viscometers were immersed in a constant temperature bath controlled to ±0.2° C. Viscosity data obtained using this procedure are accurate to ±2%.

The calculation and measurement methods described above make it possible to assess viscosity and density as a function of the temperature for prior art fracturing carrier fluids, and then to finally calculate the settling velocity of a proppant in said prior art fracturing carrier fluids.

Table 1 below shows some compounds of formula (1) that may be useful in the implementation of the present invention: RE-134, RE-236fa1, RE-236ea1, RE-245cb1, RE-338mcf2, RE-245fa1, RE-347mmy1, RE-254cb1, RE-245ca2, RE-235da1 all have a NBP above 0° C.

TABLE 1

| Compound | NBP (° C.) | Tc (° C.) |
| --- | --- | --- |
| R-227ea | −16 | 102 |
| RE-125 | −42 | 81 |
| RE-143a | −24 | 105 |
| RE-134 | 5.5 | 147 |
| RE-236fa1 | 6 | 129 |
| RE-236ea1 | 23 | — |
| RE-245cb1 | 6 | 134 |
| RE-338mcf2 | 28 | 148 |
| RE-245fa1 | 29 | 171 |
| RE-347mmy1 | 29 | 161 |
| RE-254cb1 | 35 | — |
| RE-245ca2 | 43 | 189 |

The invention claimed is:

1. A fracturing fluid suitable for fracturing a subterranean formation, comprising:
   (a) at least one linear or branched hydrofluorocarbon ether compound having 2, 3, or 4 carbon atoms and having a boiling point, at a pressure of 1 atmosphere (101325 Pa), of between 0° C. and 90° C., and
   (b) at least one proppant,
   wherein the composition does not contain added carbon dioxide.

2. The fracturing carrier fluid according to claim 1, which has a critical temperature equal to or greater than 110° C. and equal to or lower than 200° C.

3. The fracturing carrier fluid according to claim 1, wherein the at least one linear or branched hydrofluorocarbon ether compound is represented by formula (1):

$$C_nH_mF_pX_qO_t \qquad (1)$$

wherein n, m, p, q and t respectively represent the number of carbon atoms, hydrogen atoms, fluorine atoms, X atoms and O atoms forming ether function(s),
   wherein n represents 2 or 3 or 4, m≥0, 9≥p≥3, q represents 0 or 1, t represents 1 or 2, and
   X represents an halogen atom different from fluorine.

4. The fracturing carrier fluid according to claim 3, wherein n is 2 or 3, 2≤m≤4, 4≤p≤6, q represents 0 or 1, and t represents 1.

5. The fracturing carrier fluid according to claim 3, wherein the compound represented by formula (1) has a Normal Boiling Point (NBP) of between 5° C. and 85° C.

6. The fracturing carrier fluid according to claim 3, wherein the compound represented by formula (1) has a Normal Boiling Point (NBP) of between 10° C. and 80° C.

7. The fracturing carrier fluid according to claim 1, wherein the at least one hydrofluorocarbon ether compound is chosen from RE-134, RE-236fa1, RE-236ea1, RE-245cb1, RE-338mcf2, RE-245fa1, RE-347mmy1, RE-254cb1, RE-245ca2, RE-235da1, RE-365mcf2, $CHF_2$—CHF—O—$CHF_2$, $CHF_2$—$CH_2$—O—$CF_3$, $CH_2F$—CHF— 

O—CF$_3$, CH$_3$—CF$_2$—O—CF$_3$, CF$_3$—CHF—O—CH$_2$F, CHF$_2$—CF$_2$—O—CH$_2$F, isomers thereof, and mixtures thereof.

8. The fracturing carrier fluid according to claim 1, further comprising one or more additives chosen from biocides, corrosion inhibitors, surfactants, scale inhibitors, anti-foaming agents, rheology modifiers, and mixtures thereof.

9. The fracturing carrier fluid according to claim 1, which contains no added water.

10. The fracturing carrier fluid according to claim 1, wherein the hydrofluorocarbon ether compound has one ether function.

11. The fracturing carrier fluid according to claim 1, which has a critical pressure ($P_{critical}$) lower than 7 MPa.

12. The fracturing carrier fluid according to claim 1, which has a critical pressure ($P_{critical}$) lower than 5 MPa.

13. The fracturing carrier fluid according to claim 1, wherein the proppant is a granular material.

14. The fracturing carrier fluid according to claim 1, wherein the proppant is selected from the group consisting of sand, resin-coated sand, intermediate-strength proppant ceramics, and high-strength proppants.

15. The fracturing carrier fluid according to claim 1, which comprises at least one high-strength proppant selected from the group consisting of sintered bauxite, zirconium oxide, plastic pellets, steel shot, glass beads, high strength glass beads, aluminum pellets, and rounded-nut shells.

16. The fracturing carrier fluid according to claim 1, wherein the proppant is from US mesh 12 to US mesh 100.

17. The fracturing carrier fluid according to claim 1, wherein the proppant is from US mesh 20 to US mesh 100.

18. The fracturing carrier fluid according to claim 1, wherein the concentration of the proppant between 20 grams per liter of the fracturing carrier fluid and 600 grams per liter of the fracturing carrier fluid.

19. The fracturing carrier fluid according to claim 1, wherein the concentration of the proppant between 25 grams per liter of the fracturing carrier fluid and 250 grams per liter of the fracturing carrier fluid.

20. A method of fracturing a subterranean formation, comprising:
 injecting the fracturing fluid of claim 1 into a subterranean formation at a pressure sufficient to open at least one fracture in the subterranean formation.

* * * * *